Feb. 1, 1966    S. PASHAIAN ETAL    3,232,438
APPARATUS FOR THE SEPARATION OF SOLIDS
FROM LIQUID SUSPENSIONS
Filed Feb. 23, 1962

INVENTORS.
SARK PASHAIAN
HERBERT R. DAMERAU
BY
Curtis, Morris & Safford
ATTORNEYS United States Patent Office 3,232,438
Patented Feb. 1, 1966

3,232,438
APPARATUS FOR THE SEPARATION OF SOLIDS FROM LIQUID SUSPENSIONS
Sark Pashaian, Monroe, and Herbert R. Damerau, East Detroit, Mich., assignors to Ajems Laboratories, Inc., Livonia, Mich.
Filed Feb. 23, 1962, Ser. No. 175,135
8 Claims. (Cl. 210—534)

This invention relates to apparatus for separating suspended solids from liquid suspensions. More particularly it relates to devices used in connection with industrial washers and liquid grit blasting etc.

In many industrial processes, liquids at some point in the operations, carry suspended solids; but it is desirable to remove such solids and recycle the liquids so as to avoid waste. Especially in the case of liquid grit blasting of manufactured parts, the carrier liquid needs to be separated from used grit, dirt and/or other particles. It has been common practice heretofore to setle out the reusable grit and then to pass the liquid through clarifiers of one type or another to remove the finer suspended matter and leave a clarified liquid suitable for re-use in the process. To the extent that this clarification is less than complete, the continuation of the process will be impaired: first, by the abrasion of pipes and pumps and other apparatus components, and secondly, by the tendency to further settling, and consequent clogging of passages, beyond the clarification zone.

One method of clarification which has been used heretofore is a repeated reversal of flow direction by means of baffles arranged at angles so that the inertia of the heavier particles tends to separate them from the liquid, which eventually comes to the top of a clarification tank and is skimmed off over a weir. Field experience has shown that, even though only a small amount of particles go over the weir, they tend to accumulate in production operations, where abraded particles, spent abrasives and other particle matter have been carried in the liquid to a point of least turbulence. Our study of this baffle separation process has indicated that serious limitation on its effectiveness is imposed by the turbulence and cross flow caused by the reversal of direction of flow of the liquid, and that lateral flow of the liquid tends to carry the particles out of their proper sedimenting trend.

It has also been suggested to flow the liquid suspension laterally into a plurality of parallel closely spaced troughs arranged in the top of a sedimentation tank, whereby the liquid suspension can rise in the tank and overflow into these troughs and run off with a continual fine skimming action. Although this has proven effective for clarification, it requires an apparatus of relatively large size for a given volume of flow.

We have found, particularly in working with the type of clarifier just described, that skimming is not really essential in this operation. Thus, if the clarified liquid is alowed to rise to a substantial height above the weirs which form the edges of the troughs, e.g., one inch above the weirs, there is little change in the clarity of the effluent, i.e., the height of the water flowing over the lips of the weirs does not change the degree of removal of the solids, but the clarification process is dependent rather upon the upward flow velocity of the liquid; the slower and more controlled is this velocity, the higher the clarification efficiency obtained. Accordingly, our present invention is directed toward obtaining a uniform upward flow of the liquid and substantially inhibiting the horizontal and irregular flow paths.

The problem appears to be extremely difficult when it is recognized that the settled solids must be collected in the bottom of the tank or sump, that the influent suspension must be distributed across the area of the tank, and that the clarified liquid effluent must be drawn off from the top.

We have attacked this problem by dividing our clarification tank into four zones; a lower zone, in which the suspended solids settle and collect and are left quiescent, intermediate zones into which the suspension is fed and distributed laterally at low velocity, a clarification zone in which the flow of liquid is kept substantially unidirectionally upward, and a flow-off zone above the sedimentation zone in which a body of quiescent liquid is collected and slowly flows off laterally over weirs etc., and is removed therefrom.

In order to establish and maintain the unidirectional upward flow of controlled velocity, we provide a multiplicity of tubes, advantageously having substantial length and parallel sides and substantially uniform cross-section. Various cross-sectional shapes can be used, but we have found advantage in the use of square tubular passages which can be formed like an egg crate by assembling a series of plates each slotted from one side and the slots interfitting to allow the plates to interlock with the formation of square passages between them. The edges of the strips 24 and 25, or either one, can be swedged to close the slots sufficiently to prevent separation of the strips or the plates may be pressed into zig zag or other angular form and the corners butted and cemented or welded or otherwise secured together to produce tubular passages, or a multiplicity of tubes can be assembled, as such, and secured together; if such tubes are cylindrical, they provide not only the passages through the tubes but additional tubular passages between the exteriors of the tubes.

When one has a multiplicity of these vertical tubes, however formed, and of considerable length, advantageously from about one inch to several inches, and diameter in the range about .1"–2", extending over a wide area, e.g., across a tank of the liquid suspension and with a flow off level for the clarified liquid substantially above the tops of the tubes, then the liquid will rise in a controlled manner through the tubes with the flow confined to nearly vertical paths therethrough.

Even though the liquid may be somewhat turbulent upon entering the intermediate distributing zone below the tubes, upon entering the tubes the liquid loses this random motion of turbulence and assumes a more direct upward flow path. The velocity of the liquid flow in the tubes can be adjusted with reference to the size of the particles and their density, as well as to the characteristics of the liquid, so that the force of gravity pulling the particles downward overcomes the buoyancy and the upward drag of the flow in the liquid. In general, the smaller the diameter of the cross-sectional opening of the tubes, the better, so long as it does not substantially interfere with the flow and is large enough to permit settling of the solid particles.

In the accompanying drawings, we have shown a preferred embodiment of our invention and we have suggested herein certain modifications and alternatives. It should be understood that these are not intended to be exhaustive; but, on the contrary, are given for the purpose of illustrating the invention and its principles so that others may be enabled to modify and adapt it to the special conditions of various uses and to make the best and most efficient use of such materials and equipment as may be available.

Figure 1:
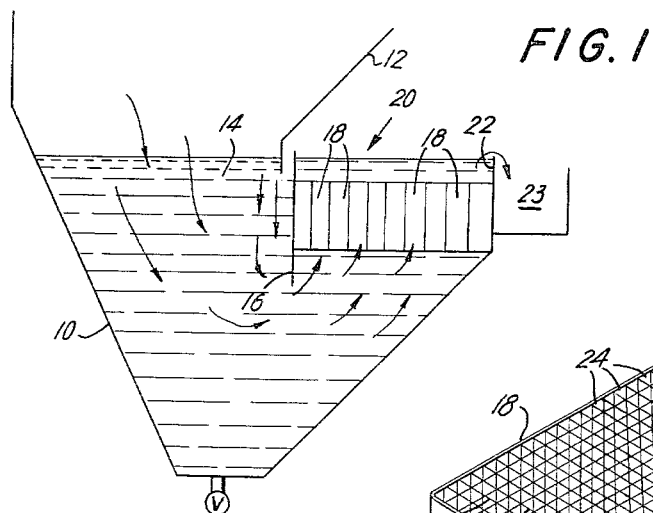
FIGURE 1 is a diagrammatic view in vertical section of a sedimentation device embodying our invention.

Referring to FIGURE 1, there is shown a conical sedimentation hopper 10, at the top of which is a slope sheet 12 onto which drain-back material comprising liquid with grit, dirt etc., collects and flows into the inlet passage 14, at the right hand side thereof, as seen in FIGURE 1. This liquid flows down toward the bottom of the hopper, during which the suspended solids are accelerated downward, both by the flow of the liquid and by the force of gravity.

The coarser solids, therefore, tend to fall immediately onto the sloping bottom of the tank 10.

As the liquid passes the bottom edge of the baffle 16, and down along the conical bottom 10, it is deflected inward and diffuses upward behind the baffle 16, passing eventually into the tubular passages 18 in the multi-tube sedimentation device 20.

As it passes upward through the tubes 18, the flow is constrained to a vertical direction, and the velocity is controlled according to the total flow, being substantially uniform in all of the tubes. This velocity is regulated to be substantially less than the sedimentation rate of the suspended solids which are to be removed; and, consequently, these solids will fall down out of the tubes to the bottom. Even though a certain amount of turbulence may still exist at the very bottom of the tubes, and in the tank below, which may tend to re-entrain the settling solids and carry them upward to some extent, the downward trend must be renewed when they rise to the point where the turbulence ceases and the liquid flow is unidirectionally upward. Thus the settling solids move down gradually through the incoming liquid and eventually settle into the bottom of the tank, whereas the clarified liquid rises above the tops of the tubes 18 and only then gradually moves laterally toward the outlet weir 22 and overflows into the trough 23, by which it is conducted off to a desired reservoir or returned to a pump or other apparatus for recycling in the process.

Figure 2:
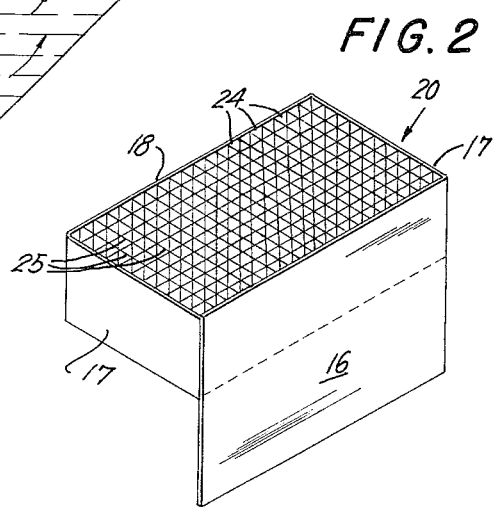
FIGURE 2 is a perspective view showing the multitubular clarification section of the device shown in FIGURE 1.
Figure 3:
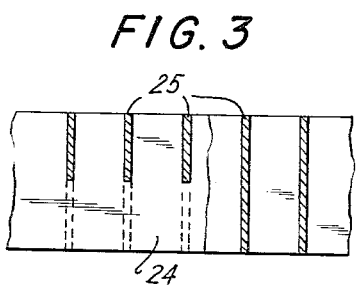
FIGURE 3 is a fragmentary view in vertical section taken in part through the centers of the tubes or cells and in part at the front of one wall, and showing a part of the tubular flow control device.

In FIGURE 2, the multi-tube sedimentation device 20 is shown and is composed of the baffle apron 16 and four sides 17 and 18 within which are mounted "egg crate" strips 24, 25. Each of these strips, as best shown in FIGURE 3, is provided with slots spaced apart the width of the tubes which are to be formed, advantageously ½" to 2". Their width is equal to the length of the tubes required, advantageously about 8" to 1'. In general, the wider the tubes, the longer they should be, in order to obtain the desired unidirectional flow in time to obtain the required settling effect.

These slotted strips are assembled with the slots of each receiving unslotted portions beyond the bottoms of registering slots in the others, as illustrated in FIGURE 3; and the entire device 20 is then mounted near the top of the tank 10, as shown in FIGURE 1; but substantially below the upper edge of the weir 22, so that a body of liquid may remain above the tops of the tubes in which a flow gradually moves toward the outlet weir.

Figure 4:
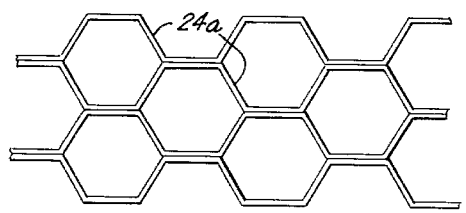
FIGURES 4 and 5 are diagrammatic plan views of other types of multi-tubular apparatus.

Instead of the "egg crate" construction, one may use a "honey comb" construction, e.g., as illustrated in FIGURE 4. In this case strips 24a are stamped to a series of 60° angles so that dihedral vertex portions are parallel and fit together and may be cemented with adhesive, or tack welded, or soldered or otherwise fastened together to give a tubular structure with hexagonal tubes extending vertically throughout.

Figure 5:
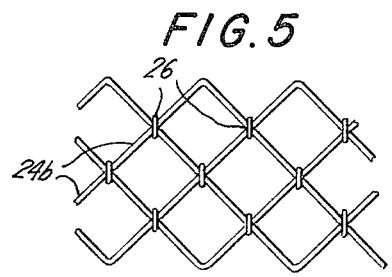

In FIGURE 5 is shown a similar device using strips of sheet metal bent to zig-zag form with 90° angles. The apices of these angles are brought together and secured, e.g., as indicated by clips 26 which engage the strips 24b at the points where they contact along their adjacent apices.

Figure 6:
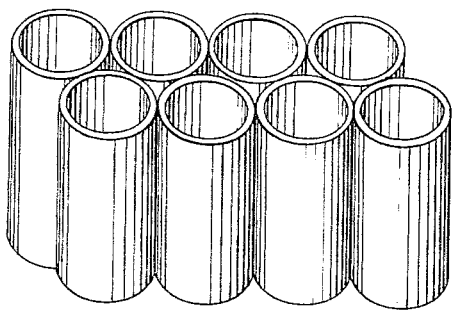
FIGURE 6 is a perspective view of a multi-tubular separator adapted for use in our invention, with the front row of tubes sectioned and partly broken away.

In FIGURES 6 is shown a structure having tubular passages formed by actual tubes which are assembled side by side and held by adhesive or tack welding or soldering etc.

Suitable cellular structures are available on the market designed for other purposes. For example, the Continental Air Filter Company, of Louisville, Kentucky makes an "E Z Wash" air filter Type E W which has such a structure and can be adapted for our purposes. Owens Corning Glass Company makes a ceramic honeycomb structure sold under the trade name "Cercor."

Various provisions may be made for directing the inlet flow; and, if desired a change of direction, to produce a preliminary separation may be intensified by use of baffles etc., e.g., as shown in the copending application of Robert G. Millhiser, Serial No. 117,444, filed on June 15, 1961. In any case, it is advantageous to make provision above the bottom of the tank for distributing the liquid as uniformly as possible without excessive turbulence or high cross-flow.

If differences of turbulence are found in different areas of the tank, different sizes and/or shapes of tubes may be used in the flow device 20 to compensate for these differences and to produce more uniform sedimentation. If greater sedimentation is required as may be the case with smaller or lighter particles, the longer tubes should be used.

A multi-tubular device of our invention gives considerable latitude in control for obtaining the degree of solids separation from the liquid as required or desired in any particular case. The depth of the device, i.e. the length of the tubes, and the ratio of cross section of the tubular openings to their vertical length, may be varied to obtain the extent of sedimentation required, and having fixed the size and length of the tubes required for the intended separation, the volume of flow can be determined by increasing the number of tubes while maintaining the velocity through the tubes at that which is most advantageous for the separation desired.

What is claimed is:

1. Apparatus for separating suspended solids from liquids which comprises a vessel adapted to hold a body of liquid with settling solids, an overflow weir at one edge of said vessel, positioned to maintain a liquid level in said body, vertical partition means open at the top and bottom, to provide flow through said partition means and to restrain said flow from lateral flow while flowing through said partition means by dividing said flow into a multiplicity of vertical columns of small transverse dimensions relative to their length, said partition means extending across said vessel, the top of said partition means disposed at a substantial distance below said liquid level thereby leaving a shallow portion of said body above said partition means, said partition means extending for a substantial depth into said body whereby said liquid flows freely into and out of the bottom and top, respectively, of said partition means and transversely within said shallow portion across the top of said partion means, means for supplying liquid suspension to the space beneath said partition means but substantially above the bottom of said vessel, means for collecting overflow and conducting it away, and means for removing settled solids from the bottom of said vessel.

2. Apparatus as defined in claim 1 in which the partition means are connected to form a honeycomb structure with its cells open at both ends.

3. Apparatus as defined in claim 1 in which the partition means are connected to form a square celled structure with open cells vertically oriented.

4. Apparatus as defined in claim 1 in which the partition means are connected to form a multiplicity of tubes secured in side by side relation and open top and bottom and means confining the flow of liquid to said tubes.

5. An apparatus as defined in claim 1 in which the partition means are composed of a plurality of vertically positioned stiff strips resistant to said liquid, meeting one another at, and diverging from, vertical lines spaced along their length, running from the top to the bottom of said strips, whereby to define vertical cells substantially surrounded by said strips.

6. Apparatus as defined in claim 5 in which the strips are connected and held vertically positioned by slots in at least some into which other strips are inserted.

7. Apparatus as defined in claim 5 in which the strips are connected and held vertically positioned by cementing together at said vertical lines.

8. Apparatus as defined in claim 5 in which the strips are joined by fusion at said vertical lines.

References Cited by the Examiner

UNITED STATES PATENTS

| | | | |
|---|---|---|---|
| 1,020,013 | 3/1912 | Arbuckle | 210—521 |
| 1,190,863 | 7/1916 | Corne et al. | 210—521 X |
| 1,586,610 | 6/1926 | Chance | 210—83 |
| 1,733,324 | 10/1929 | Wetherbee | 210—84 |
| 2,193,706 | 3/1940 | Attwood | 210—84 |

REUBEN FRIEDMAN, *Primary Examiner.*

UNITED STATES PATENT OFFICE
CERTIFICATE OF CORRECTION

Patent No. 2,922,438                           February 1, 1960

Sark Pashaian et al.

It is hereby certified that error appears in the above numbered patent requiring correction and that the said Letters Patent should read as corrected below.

In the grant, lines 2 and 12 and in the heading to the printed specification, line 5, for "Ajems", each occurrence, read -- Ajem --.

Signed and sealed this 26th day of September 1967.

(SEAL)
Attest:

ERNEST W. SWIDER                               EDWARD J. BRENNER
Attesting Officer                                        Commissioner of Patents